United States Patent [19]

Yamaguchi et al.

[11] Patent Number: 4,650,726
[45] Date of Patent: Mar. 17, 1987

[54] CERAMIC SUBSTRATE OF NA$_2$O AND TA$_2$O$_5$ FOR THIN FILM MAGNETIC HEAD

[75] Inventors: Takashi Yamaguchi, Tokyo; Naomi Nagasawa; Hidemasa Tamura, both of Kanagawa, all of Japan

[73] Assignee: Sony Corporation, Tokyo, Japan

[21] Appl. No.: 788,147

[22] Filed: Oct. 16, 1985

[30] Foreign Application Priority Data

Oct. 26, 1985 [JP] Japan ............................ 59-225169

[51] Int. Cl.$^4$ .................. C04B 35/00; B32B 15/04; B32B 18/00; G11B 5/704
[52] U.S. Cl. ................................ 428/694; 428/689; 428/702; 428/900; 501/134
[58] Field of Search ............ 501/134; 360/125, 126, 360/127; 428/433, 689, 694, 702, 900; 427/132

[56] References Cited

PUBLICATIONS

King, B. W.; et al.; "System Na$_2$O-Ta$_2$O$_5$" Fig. 198, *Phase Diagrams for Ceramists*, American Ceramic Society, 1964, p. 95.

*Primary Examiner*—Mark L. Bell
*Attorney, Agent, or Firm*—Hill, Van Santen, Steadman & Simpson

[57] ABSTRACT

A ceramic composition having the general formula:

$$xNa_2O \cdot yTa_2O_5$$

wherein the ratio of x/y is at least 0.85 less than 1.00, the composition having a coefficient of thermal expansion which matches that of a metal thin film type magnetic recording head so that the composition can be used as a base for the head with a minimum risk of detachment or peeling between the metal thin film and the ceramic composition substrate.

3 Claims, 4 Drawing Figures

CERAMIC SUBSTRATE OF NA$_2$O AND TA$_2$O$_5$ FOR THIN FILM MAGNETIC HEAD

BACKGROUND OF THE INVENTION

1. Field of the Invention

The present invention is in the field of ceramic compositions based on oxides of sodium and tantalum and having coefficients of thermal expansion suitable for incorporating the ceramic composition into a magnetic thin film recording and reproducing head.

2. Description of the Prior Art

In the field of magnetic recording, there is a tendency towards higher density and higher frequency in the recording signals. In view of the tendency towards higher density recording, metal powder tapes have been used which employ powders of ferromagnetic metal such as Fe, Co and Ni. Also used are the evaporated type tapes which have ferromagnetic metal materials deposited by means of evaporation on a base film. These types of magnetic recording media are used with magnetic heads which must have a high saturation flux density Bs.

In using the high density recording mentioned above, the track width of the magnetic recording on the recording medium must also be reduced. This is coupled with a requirement that there is an extremely narrow track width provided on the magnetic head.

To meet these requirements, it has previously been suggested to use a composite type magnetic head employing a nonmagnetic substrate and a magnetic metal thin film which is used as the magnetic core, the nonmagnetic substrate and the thin film being stacked one on the other and the magnetic thin film is used as a track. As an alternative, a thin film type magnetic head is employed wherein the magnetic metal thin film and the conductive metal film are stacked on a nonmagnetic base using an intermediate insulating thin film. Thus, the use of metal thin films is increasing rapidly in the field of modern magnetic recording.

When a metal thin film is used in a magnetic head, a ceramic base is usually employed as a substrate. The conventional ceramic substrate has the drawback that it has a thermal expansion coefficient which is markedly lower than that of the metal film and hence the metal film tends to be detached from the ceramic base during exposure to higher temperatures. For example, the coefficient of linear expansion $\alpha$ of "Permalloy" or "Sendust" used in thin film magnetic heads amounts to about 130° to $160 \times 10^{-7}$/°C., whereas that of the commonly used barium titanate and calcium titanate ceramic bases is usually considerably lower, amounting to about 90° to $100 \times 10^{-7}$/°C. and 100° to $120 \times 10^{-7}$/°C., respectively.

When a metal thin film having some magnetostriction is used in the thin film type magnetic head, a strain is introduced into the metal film during the manufacturing process, such as physical vapor deposition or cooling after heat treatment. This metal strain causes a magnetic anisotropy to be introduced into the metal thin film because of the magnetostriction, so that its permeability is deteriorated. Thus, there is a need for a ceramic base having a linear expansion coefficient which is comparable to that of the metal thin film itself.

SUMMARY OF THE INVENTION

The present invention seeks to provide a novel ceramic composition having a linear expansion coefficient which is comparable to that of the metal thin film with which it is used.

As a result of prolonged research, the present inventors have found that the linear expansion coefficient of a ceramic composition can be controlled by employing specific relative percentages of components in the two-component ceramic composition of the Na$_2$O-Ta$_2$O$_5$. The present invention specifically provides a ceramic composition represented by the general formula xNa$_2$O . yTa$_2$O$_5$ wherein the ratio of x/y is equal to or greater than 0.85 but is less than 1.00.

The present invention provides ceramic compositions of the Na$_2$O-Ta$_2$O$_5$ series as above defined in such a manner that the ceramic composition exhibits a thermal expansion coefficient in the range from 130° to $170 \times 10^{-7}$/°C., which is approximately equal to that of the metal thin film. Consequently, when the ceramic composition of the present invention is applied to a magnetic head, the head is highly reliable in operation with a minimum risk of detachment or peeling between the metal thin film and the nonmagnetic ceramic substrate.

BRIEF DESCRIPTION OF THE DRAWINGS

A further description of the present invention will be made in conjunction with the attached sheets of drawings in which.

DESCRIPTION OF THE PREFERRED EMBODIMENTS

The ceramic composition of the present invention, represented by the general formula xNa$_2$O . yTa$_2$O$_5$ has a ratio of components which is critical. With a ratio of x/y less than 0.85, the linear expansion coefficient $\alpha$ is less than $130 \times 10^{-7}$/°C. which is too small relative to the metal thin film. With a ratio of x/y equal to or greater than 1.00, it is not possible to sinter the composition so that it is not possible to obtain a high quality ceramic. When the component ratio of the ceramic composition is such that the ratio x/y is equal to or greater than 0.85 but less than 1.00, the linear expansion coefficient can be controlled within the range of 130° to $170 \times 10^{-7}$/°C.

The present invention will be explained with reference to certain specific examples. It should be noted, however, that the examples are given only as illustrations and are not to be construed as limiting the scope of the present invention.

EXAMPLE

Powders of $Na_2CO_3$ and $Ta_2O_5$, each having a purity greater than 99.9% were prepared. The starting powders were weighed out to give the required composition, and the weighed amounts of these powders were ball milled with ethanol as the mixing medium. The mixture was heated to remove the ethanol. The mixture was then molded under a pressure of 1000 kg/cm² and the molded product was calcined in air at 900° C. for three hours.

The baked product was crushed in a mortar, again ball milled with ethanol as the mixing medium, and heated to remove the ethanol. The resulting product was molded under a pressure of 1500 kg/cm² and fired in air at a temperature of from 1350° to 1500° C. for three hours to produce a ceramic composition.

Various samples of the ceramic composition were prepared by using different percentages of the $Na_2CO_3$ and $Ta_2O_5$ components. These samples were shaped into prisms and the density of these prismatic samples, and the linear expansion coefficients of each of these prismatic samples was measured with the aid of a linear dilatometer for a temperature range of 40° to 600° C.

Figure 1:
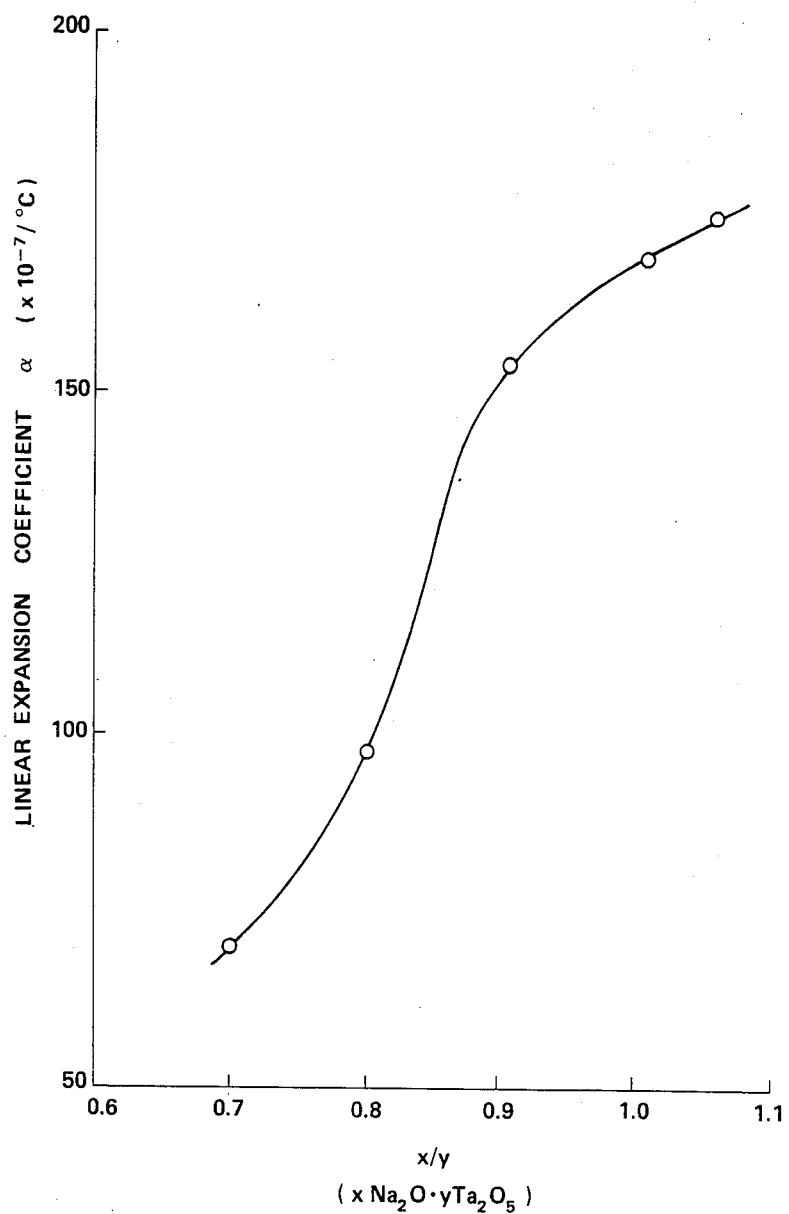
FIG. 1 is a chart showing the relationship between the linear expansion coefficient $\alpha$ and the ratio x/y for the ceramic composition represented by the formula xNa$_2$O . yTa$_2$O$_5$.
Figure 2:
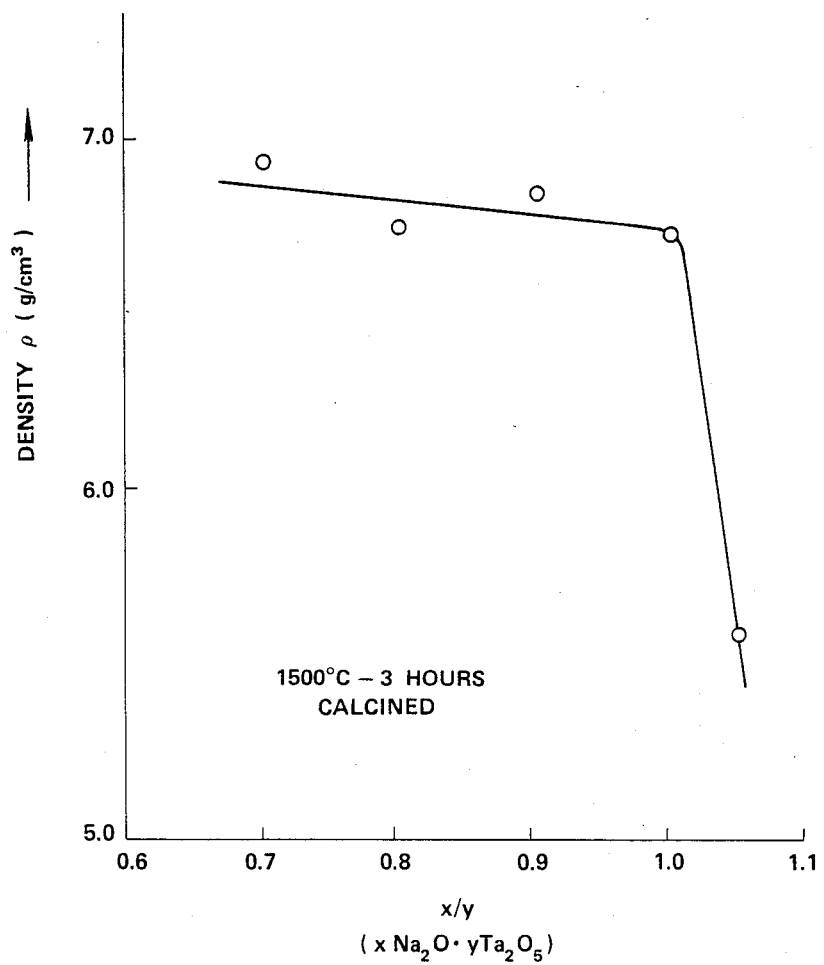
FIG. 2 is a chart showing the relationship between the density, under identical calcining conditions and the ratio x/y for the ceramic composition represented by the formula xNa$_2$O . yTa$_2$O$_5$.

The results are shown in FIGS. 1 and 2 of the drawings wherein the thermal coefficient $\alpha$ and the density are plotted against the ratio x/y, respectively, with a ceramic composition represented by the formula $xNa_2O \cdot yTa_2O_5$.

It will be seen from FIG. 1 that the coefficient $\alpha$ of the ceramic composition is increased with an increase in the $Na_2O$ content and that with a ratio x/y greater than 0.85, the coefficient $\alpha$ lies in the range of 130° to $170 \times 10^{-7}/°C$. or approximately equal to the coefficient for the metal film.

It will be seen from FIG. 2 that the density of the ceramic composition is decreased rapidly when the ratio x/y exceeds 1.0 and the composition is then unable to be sintered.

The present invention will also be explained by referring to an applicational example wherein the ceramic composition of the present invention was applied to a magnetic head.

APPLICATIONAL EXAMPLE 1

Figure 3:
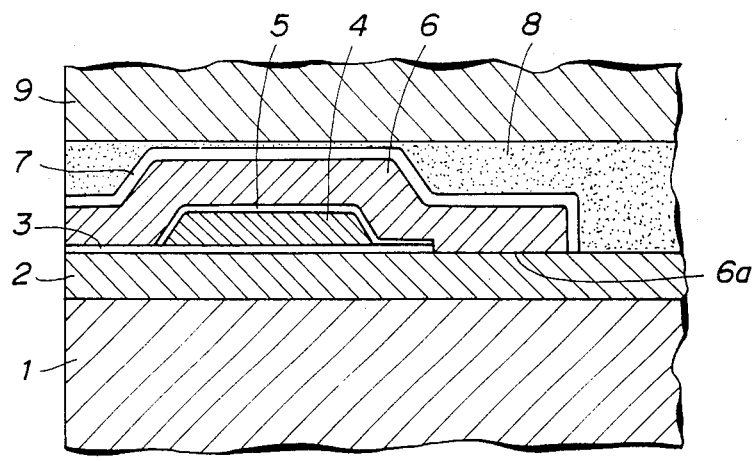
FIG. 3 is a cross-sectional view of a thin film type magnetic head wherein the ceramic composition of the present invention is used as the nonmagnetic substrate.

FIG. 3 shows the example of a thin film magnetic head wherein the ceramic composition of the present invention is used as a nonmagnetic base of the magnetic head. In this example, the ceramic composition prepared in accordance with the preceding example was used as a nonmagnetic base 1. A lower magnetic film 2 such as "Sendust" film, a (Fe-Al-Si alloy) film, was deposited on the base 1 for providing the magnetic path. On the lower magnetic film 2 there was deposited a signal conductor 4 over an intermediate insulating layer 3 composed of material such as $SiO_2$. The signal conductor 4 was formed by etching a copper thin film deposited by sputtering. The conductor 4 is arranged to provide the recording and/or playback signals to the closed magnetic circuit constituted by the lower magnetic film 2 or an upper magnetic film 6.

On the signal conductor 4 there is formed an upper magnetic film 6 such as a "Sendust" film using an intermediate second insulating layer 5. The rear part 6a of the upper magnetic film is connected to the lower magnetic film 2 for providing a back gap whereas the front part of the film 6 is facing the lower magnetic film 2 for providing a working gap. The thin film magnetic head constructed in this manner is coated by a protective film 7 such as an $SiO_2$ film and a nonmagnetic protective plate 9 is bonded to the head by a solidified molten glass layer 8. The protective plate is formed of the ceramic composition prepared in the preceding example, as also is the nonmagnetic substrate 1.

In the thin film type magnetic head since the thermal expansion coefficient of the nonmagnetic substrate 1 is about equal to that of the lower magnetic film 2, the film 2 does not tend to become detached even upon heat treatment for increasing the magnetic properties of the metal thin film or upon heat treatment employed during the manufacturing process, such as glass melting or bonding, and the film 2 does not evidence a loss in permeability even upon such heat treatment.

APPLICATIONAL EXAMPLE 2

Figure 4:
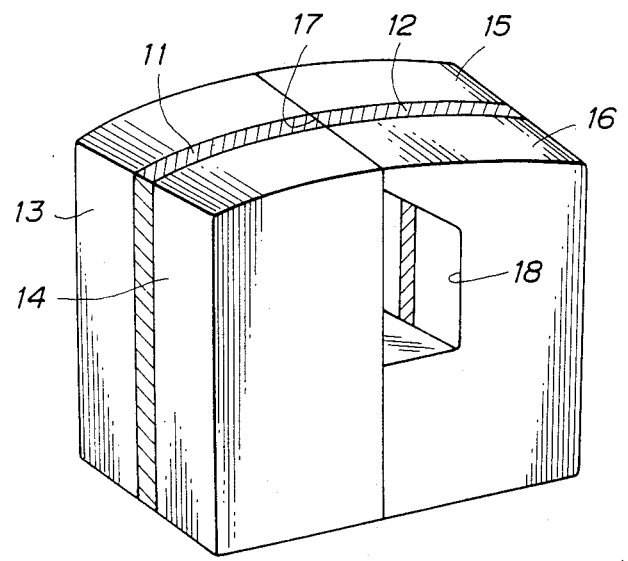
FIG. 4 is a view in perspective showing an example of the composite type magnetic head in which the ceramic composition of the present invention is used as the nonmagnetic substrate.

An applicational example in which the ceramic composition of the present invention is applied to a composite magnetic head is shown in FIG. 4. The magnetic head is constructed such that the magnetic metal layers 11 and 12 are disposed between nonmagnetic guard plates 13, 14, 15, 16 and a working gap 17 is provided by the abutment plane of the magnetic metal layers 11, 12 with the track width equal to the thickness of the magnetic metal layers 11, 12.

A winding slot 18 is provided in the magnetic head and a coil is placed within the slot 18 for providing recording and playback signals to the magnetic metal layers 11, 12.

The magnetic metal layers 11, 12 may be provided by a vacuum film forming technique such as lamination of a magnetic metal layer, for example, a thin band of "Sendust" alloy or a non-crystalline alloy commonly used with this type of head, or by sputtering or evaporating a ferromagnetic metal material.

The nonmagnetic guard materials 13, 14 are formed with the ceramic composition having a linear expansion coefficient $\alpha$ about equal to that of the magnetic metal layers 11, 12 so that there is no risk of detachment of the metal layers as a result of the differential thermal expansion, similarly to the preceding Applicational Example 1.

It should be evident that various modifications can be made to the described embodiments without departing from the scope of the present invention.

We claim as our invention:

1. A thin film magnetic head having a base and a magnetic film deposited thereon, said base being composed of a ceramic composition having the general formula:

$$xNa_2O \cdot yTa_2O_5$$

wherein the ratio of x/y is at least 0.85 but less than 1.00, said composition having a coefficient of thermal expansion of at least $130 \times 10^{-7}/°C$.

2. A magnetic head according to claim 1 wherein said composition has a coefficient of thermal expansion of 130° to $170 \times 10^{-7}/°C$.

3. A magnetic head according to claim 1 wherein said magnetic film is composed of an Fe-Al-Si alloy.

* * * * *